United States Patent
Zhang et al.

(10) Patent No.: US 12,525,309 B2
(45) Date of Patent: Jan. 13, 2026

(54) MEMORY SYSTEM AND AN OPERATING METHOD THEREOF

(71) Applicant: YANGTZE MEMORY TECHNOLOGIES CO., LTD., Wuhan (CN)

(72) Inventors: Shuai Zhang, Wuhan (CN); Yaoyao Tian, Wuhan (CN); Ya Wang, Wuhan (CN); Wei Qi, Wuhan (CN); Da Li, Wuhan (CN); Wenping Chen, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/409,169

(22) Filed: Jan. 10, 2024

(65) Prior Publication Data

US 2025/0104788 A1   Mar. 27, 2025

(30) Foreign Application Priority Data

Sep. 27, 2023   (CN) .......................... 202311270342.0

(51) Int. Cl.
*G11C 29/42* (2006.01)
*G11C 29/12* (2006.01)

(52) U.S. Cl.
CPC ........ *G11C 29/12005* (2013.01); *G11C 29/42* (2013.01); *G11C 2029/1202* (2013.01)

(58) Field of Classification Search
CPC ... G11C 29/42; G11C 29/52; G11C 29/12005; G06F 3/0619; G06F 3/0659; G06F 3/0673; G06F 11/1048; G06F 11/1072; G06F 11/0766
See application file for complete search history.

(56) References Cited

U.S. PATENT DOCUMENTS

| 2015/0262677 | A1  | 9/2015  | Lin et al. |
| 2017/0069395 | A1* | 3/2017  | Yao ..................... G06F 12/0246 |
| 2019/0371419 | A1* | 12/2019 | Ema ....................... G11C 16/16 |
| 2020/0379678 | A1* | 12/2020 | Kim ..................... G06F 3/0659 |

FOREIGN PATENT DOCUMENTS

| CN | 110910940  | A | 3/2020  |
| CN | 113553213  | A | 10/2021 |
| CN | 114586101  | A | 6/2022  |
| CN | 115565580  | A | 1/2023  |
| JP | 2004095145 | A | 3/2004  |

OTHER PUBLICATIONS

Yangtze Memory Technologies Co., Ltd., "First Examination Opinion Notice," Date of Publication: Aug. 29, 2025, Chinese Patent App. No. 202311270342.0, 8 p. (translation 8 p.).

* cited by examiner

*Primary Examiner* — Shelly A Chase
(74) *Attorney, Agent, or Firm* — Conley Rose, P.C.

(57) ABSTRACT

A memory system comprises: a memory device including a first word line; and a memory controller coupled to the memory device and configured to: acquire the number of read failure bits of a memory cell page coupled to the first word line; determine whether the number of read failure bits of the memory cell page is greater than a preset threshold; and control the memory device to perform a reprogram operation on the memory cell page in response to the number of read failure bits of the memory cell page being greater than the preset threshold.

20 Claims, 16 Drawing Sheets

MEMORY SYSTEM AND AN OPERATING METHOD THEREOF

CROSS-REFERENCE TO RELATED APPLICATIONS

The present application claims priority to Chinese Patent Application No. 2023112703420, which was filed Sep. 27, 2023, is titled "A MEMORY SYSTEM AND AN OPERATING METHOD OF THE MEMORY SYSTEM," and is hereby incorporated herein by reference in its entirety.

TECHNICAL FIELD

The present application relates to the technical field of semiconductor chips, and in particular to a memory system and an operating method thereof.

BACKGROUND

The semiconductor memory device may include a volatile memory device and a non-volatile memory device. The non-volatile memory device can save data even when the power supply is removed. The non-volatile memory device may include flash, electrically erasable and programmable ROM (EEPROM), ferroelectric RAM (FRAM), and so on, wherein the flash may further comprise NOR flash and NAND flash.

SUMMARY

The examples disclosed in this application provide a memory system and an operating method thereof for reducing the wear of a memory device and increasing the service life of the memory system.

In order to achieve the above purpose, the examples of the present application employ the following technical solution:

A first aspect provides a memory system comprising: a memory device comprising a first word line; and a memory controller coupled to the memory device and configured to: acquire the number of read failure bits of a memory cell page coupled to the first word line; determine whether the number of read failure bits of the memory cell page is greater than a preset threshold; and control the memory device to perform a reprogram operation on the memory cell page in response to the number of read failure bits of the memory cell page being greater than the preset threshold. In this application, when the number of read failure bits (i.e., the number of bits in which an error occurs in the data) of the memory cell page coupled to the first word line is greater than a preset threshold value, the reprogram operation is performed on the memory cell page coupled to the first word line so as to weaken or even eliminate the threshold voltage offset of the programmed memory cell. Therefore, during a read operation, even if there are a small number of bits in the readout data where an error occurs, correct data can be read out after error correction by the ECC algorithm. Compared with the data refresh operation in other solutions, in the present application, by performing a reprogram operation on the memory cell page coupled to the first word line, the number of times the memory device is erased may be reduced, thus reducing the wear of the memory device and improving the service life of the memory system to a certain extent.

In some examples, the memory device further comprises a second word line, the first word line being adjacent to the second word line. The memory cells coupled to the second word line affect the charge loss rate of the memory cell page coupled to the first word line. The charge loss of the memory cell page coupled to the first word line is more severe because a plurality of memory cells coupled to the second word line are in an unprogrammed erase state. That is, the reliability of the memory cell page coupled to the first word line greatly affects the reliability of the memory system. In the present application, performing a reprogram operation on the memory cell page coupled to the first word line according to the number of read failure bits of the memory cell page coupled to the first word line may more effectively reduce the data damage and improve the reliability of the memory system.

In some examples, the memory controller is further configured to: read data of the memory cell page in response to the number of read failure bits of the memory cell page being greater than the preset threshold; when there are bits in the readout data in which an error occurs, perform error correction on the data of the memory cell page to obtain error corrected data of the memory cell page, wherein the data after error correction by the ECC algorithm is accurate data; and send the error corrected data of the memory cell page and a reprogram instruction to the memory device to perform a reprogram operation on the memory cell page, thus to write the accurate data into the memory cell page.

In some examples, the memory device comprises a control logic, a row decoder and a page buffer, the memory cell page comprises a first memory cell and a second memory cell, and the control logic is configured to: control the row decoder to provide a reprogram voltage to the first word line in response to the reprogram instruction; and control the page buffer to provide a program select voltage to a bit line coupled to the first memory cell and output a program inhibit voltage to a bit line coupled to the second memory cell based on the error corrected data, wherein a threshold voltage of the first memory cell is higher than a threshold voltage of the second memory cell. The higher the threshold voltage, the more severe is the vertical charge loss of the memory cell. Therefore, the vertical charge loss of the first memory cell having a high threshold voltage is larger and the vertical charge loss of the second memory cell having a low threshold voltage is smaller. Therefore, during the reprogram operation, a program select voltage is provided to a bit line coupled to the first memory cell to program the first memory cell, thereby weakening or even eliminating a threshold voltage offset of the first memory cell caused by charge loss; and a program inhibit voltage is output to a bit line coupled to the second memory cell, so as to prevent programming of the second memory cell to prevent over-programming of the second memory cell.

In some examples, the second memory cell having a low threshold voltage does not need to be programmed. An initial value of the reprogram voltage is greater than an initial value of an original program voltage, thereby saving time required for the reprogram operation.

In some examples, the control logic is further configured to: after controlling the row decoder to output the reprogram voltage to the first word line, control the row decoder to output a verification voltage to the first word line; and control the page buffer to output a bit line voltage to the bit line coupled to the first memory cell. The program result is thereby verified and the accuracy of the reprogram operation is ensured.

A second aspect provides an operating method of a memory system, the memory system comprising: a memory device comprising a first word line; and a memory controller coupled to the memory device, wherein the operating method comprises: acquiring the number of read failure bits of a memory cell page coupled to the first word line; determining whether the number of read failure bits of the memory cell page is greater than a preset threshold; and controlling the memory device to perform a reprogram operation on the memory cell page in response to the number of read failure bits of the memory cell page being greater than the preset threshold.

In some examples, the memory device further comprises a second word line, the first word line being adjacent to the second word line, and wherein a plurality of memory cells coupled to the second word line are in an unprogrammed erase state.

In some examples, controlling the memory device to perform a reprogram operation on the memory cell page coupled to the word line comprises: reading data of the memory cell page in response to the number of read failure bits of the memory cell page being greater than the preset threshold; performing error correction on the data of the memory cell page to obtain error corrected data of the memory cell page; and sending the error corrected data of the memory cell page and a reprogram instruction to the memory device to perform a reprogram operation on the memory cell page.

In some examples, the memory device comprises a control logic, a row decoder and a page buffer, the memory cell page comprises a first memory cell and a second memory cell, and performing the reprogram operation on the memory cell page further comprises: controlling, by the control logic, the row decoder to provide a reprogram voltage to the first word line in response to the reprogram instruction; and controlling the page buffer to provide a program select voltage to a bit line coupled to the first memory cell and provide a program inhibit voltage to a bit line coupled to the second memory cell based on the error corrected data, wherein a threshold voltage of the first memory cell is higher than a threshold voltage of the second memory cell.

In some examples, an initial value of the reprogram voltage is greater than an initial value of an original program voltage.

In some examples, the operating method comprises: after controlling, by the control logic, the row decoder to provide a reprogram voltage to the first word line, controlling, by the control logic, the row decoder to output a verification voltage to the first word line; and controlling, by the control logic, the page buffer to output a bit line voltage to the bit line coupled to the first memory cell.

A third aspect provides a computer readable storage medium storing thereon computer executable instructions that, after being executed, can implement the method of any one of the first aspect.

A fourth aspect provides a computer device comprising a processor; and a readable storage medium coupled to the processor and storing thereon executable instructions that, when executed by the processor, can implement the method of any one of the first aspect.

BRIEF DESCRIPTION OF THE DRAWINGS

In order to illustrate the technical solutions in the present application more clearly, the accompanying drawings required in some examples of the present application will be briefly introduced in the following. The accompanying drawings in the following description are only drawings of some examples of the present application. For those of ordinary skill in the art, other drawings can also be obtained based on these drawings. In addition, the drawings in the following description can be regarded as schematic diagrams, and are not limitations on the actual size of the product, the actual process of the method, the actual timing of signals, and the like involved in the examples of the present disclosure.

REFERENCE NUMERALS

Figure 1:
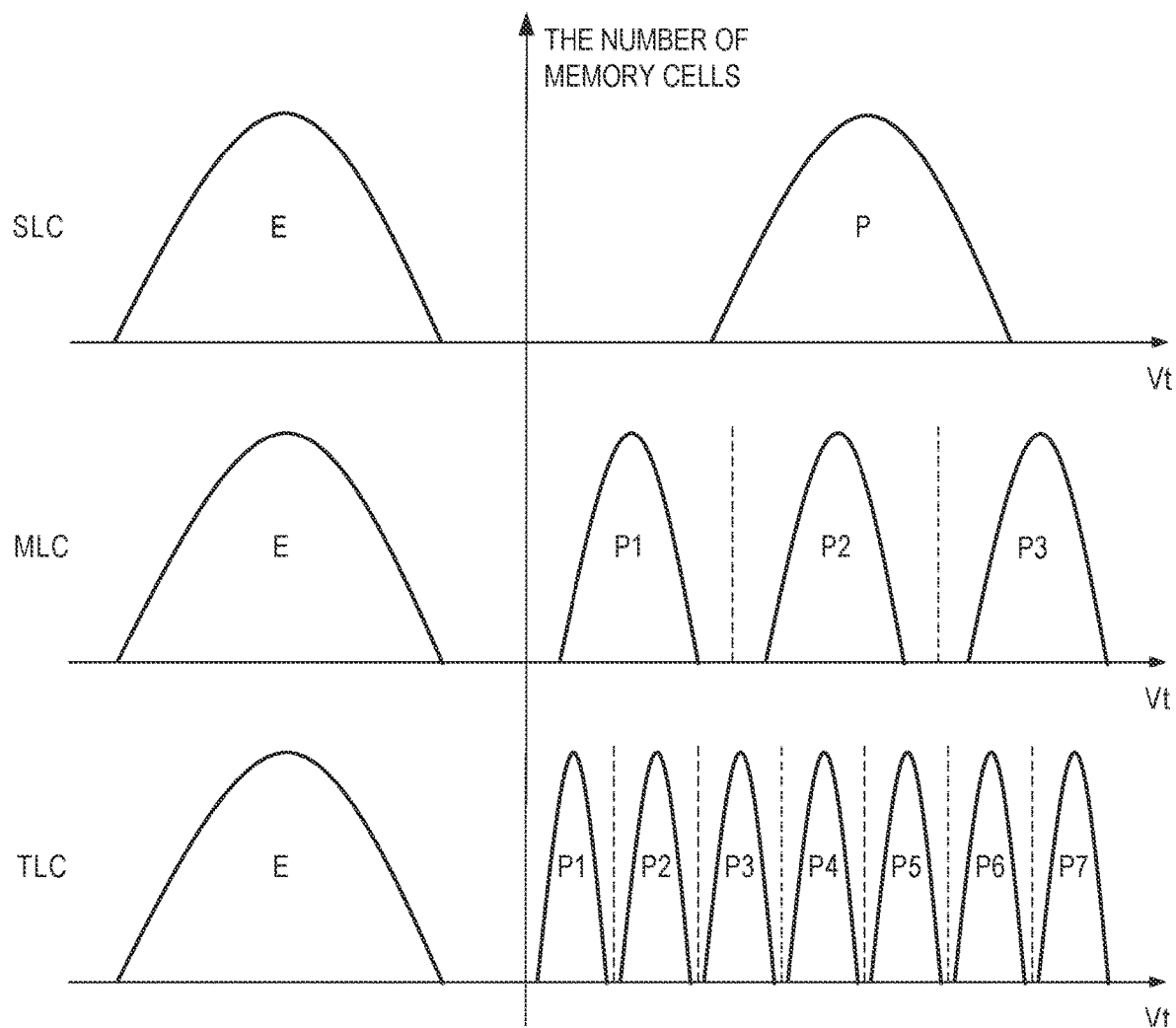
FIG. 1 is a schematic diagram of a memory cell threshold voltage distribution provided by an example of the present application.

100 memory system; 110 memory controller; 120 memory device; 200 memory cell array; 210 memory cell block; 220 memory cell string; 221 top select transistor; 222 dummy memory cell; 223 memory cell; 224 bottom select transistor; 300 peripheral circuit; 310 I/O interface; 320 control logic; 330 line decoder; 340 voltage generator; 350 column decoder; 360 data bus; 370 register; 380 page buffer; 410 memory stack layer; 411 gate conductive layer; 412 dielectric layer; 420 substrate; 430 top select line; 440 word line; 450 bottom select line; 510 processing unit; 520 host interface; 530 error correction module; 540 memory device interface.

DETAILED DESCRIPTION

The technical solutions in some examples of the present disclosure will be clearly and completely described below in conjunction with FIGS. 1-17. The described examples are merely some of the examples of the present disclosure, not all of them. All other examples obtained by those of ordinary skill in the art based on the examples provided in the present disclosure fall within the scope of the present disclosure.

Throughout the specification and claims, the term "comprising" is interpreted in an open and inclusive sense, i.e., "including, but not limited to" unless required otherwise in the context. In the description of the specification, the terms "one example", "some examples", "example", "in some examples" are intended to indicate particular features, structures, materials or characteristics associated with the examples are included in at least one example of the present disclosure. Schematic representations of the above terms are not referring to the same example. Furthermore, the particular features, structures, materials or characteristics may be included in any suitable manner in any one or more examples.

Hereinafter, the terms "first" and "second" are used for descriptive purposes only, and shall not be understood as indicating or implying relative importance or implicitly specifying the quantity of indicated technical features. Thus, a feature defined by "first" and "second" may explicitly or implicitly include one or more of these features. In the description of the examples of the present disclosure, "plurality" means two or more, unless otherwise specified.

When describing some examples, the expression "coupled" and its derivatives may be used. For example, when describing some examples, the term "coupled" may be used to indicate that two or more components are in direct physical or electrical contact, and in this case, "coupled" can also be described as "connected". In addition, the term "coupled" may also mean that two or more components are not in direct contact with each other, but still cooperate or interact with each other. The examples disclosed herein are not limited by the context herein.

The use of "configured to" herein is open and inclusive language that does not exclude devices that are adapted to or configured to perform additional tasks or operations.

The flash is a non-volatile memory device that includes a plurality of memory cells that can be electrically erased and reprogrammed. The memory cell may store charges by a program operation, and the stored charges in the memory cell may be removed by an erase operation.

The electric field generated by the charges may affect the threshold voltage (Vt) of the memory cell. The more charges the memory cell stores, the greater the threshold voltage of the memory cell is. As shown in FIG. 1, the memory cells may be divided into single-level cell (SLC) type, multi-level cell (MLC) type, trinary-level cell (TLC) type, and so on according to different threshold voltage distributions. The SLC has two states, i.e., one erase (E) state and one program (P) state. The MLC has four states, i.e., one erase state and three program states (including P1 state, P2 state and P3 state). The MLC has eight states, i.e., one erase state and seven program states (including P1 state, P2 state, P3 state, P4 state, P5 state, P6 state and P7 state).

When a read operation is performed, the state of the memory cell may be recognized through the read voltage to read out data. Taking SLC as an example, when the threshold voltage of the memory cell is greater than the read voltage, the memory cell is recognized as in the P state and data "0" is read out; when the threshold voltage of the memory cell is less than the read voltage, the memory cell is recognized as in the E state and data "1" is read out.

Figure 2:
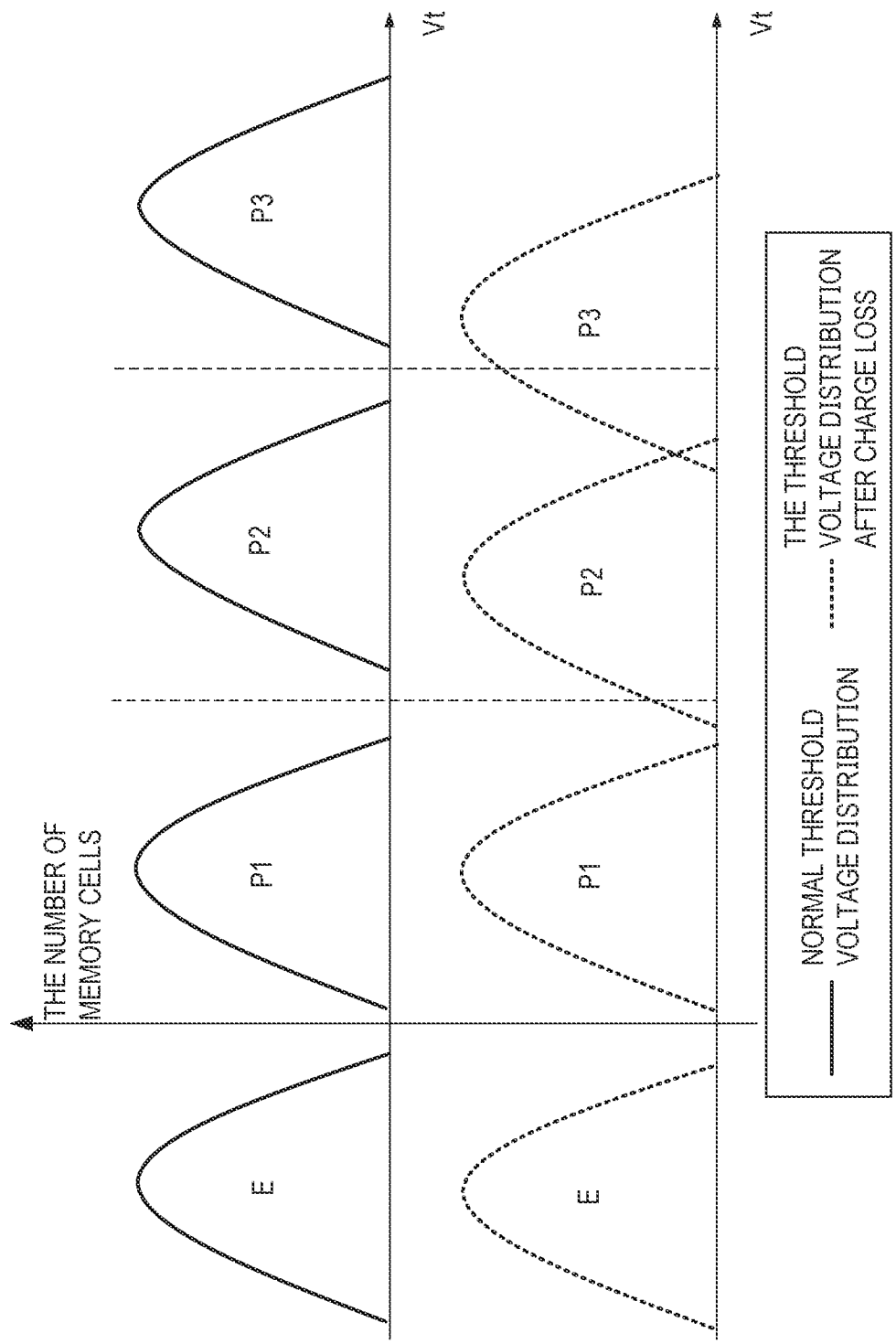
FIG. 2 is a schematic diagram comparing the normal threshold voltage distribution and the threshold voltage distribution after charge loss provided by an example of the present application.

It can be seen that after a memory cell is programmed, it is important to be able to read its state with a high degree of accuracy. However, due to various factors such as charge loss, as shown in FIG. 2, the charge loss will cause the threshold voltage of the memory cell to decrease, which is shown on the threshold voltage distribution diagram as a leftward shift of the threshold voltage, a widening of the threshold voltage distribution, and a change in the state of the memory cell (i.e., different from a state of being programmed), resulting in an inability to accurately read out the state of the memory cell, leading to errors in data reading.

Thus, data bits in which an error occurs may be encountered when reading data from a non-volatile memory device. In some examples, some form of error checking and correcting (ECC) algorithm may be used to check and correct data bits in which an error occurs. A common ECC algorithm stores additional parity check codes during a write process to set parity of a set of data bits to a desired logic level, wherein the additional parity check codes are sometimes called error correction codes. During a read process, the ECC algorithm decodes the parity check code by calculating the parity of the set of data bits to detect data errors and correct data that is not seriously erroneous. In some examples, the more data errors there are, the longer the ECC algorithm spends correcting the data.

In order to prevent a large number of erroneous data bits from causing the ECC algorithm to fail to correct the data, resulting in data corruption, a data refresh operation may be performed to restore the memory cell to the desired state. In some examples, the data refresh of a memory cell is accomplished by reading the data in the memory cell, correcting errors detected by the ECC algorithm, programming the error corrected data into different memory blocks, and erasing the memory block where the data was originally stored. When the number of data refreshes increases, the memory blocks will undergo multiple programming and erasing, which will have a great adverse impact on the service life of non-volatile memory devices.

In the examples of present application, when the number of read failure bits (i.e., the number of bits in which an error occurs in the data) of the memory cell page coupled to the first word line is greater than a preset threshold value, the reprogram operation is performed on the memory cell page coupled to the first word line so as to weaken or even eliminate the threshold voltage offset of the programmed memory cell. Therefore, during a read operation, even if there are a small number of bits in the readout data where an error occurs, correct data can be read out after error correction. In the present application, by performing a reprogram operation on the memory cell page coupled to the first word line, the number of times the memory device is erased may be reduced, thus reducing the wear of the memory device and improving the service life of the memory system to a certain extent.

Figure 3:
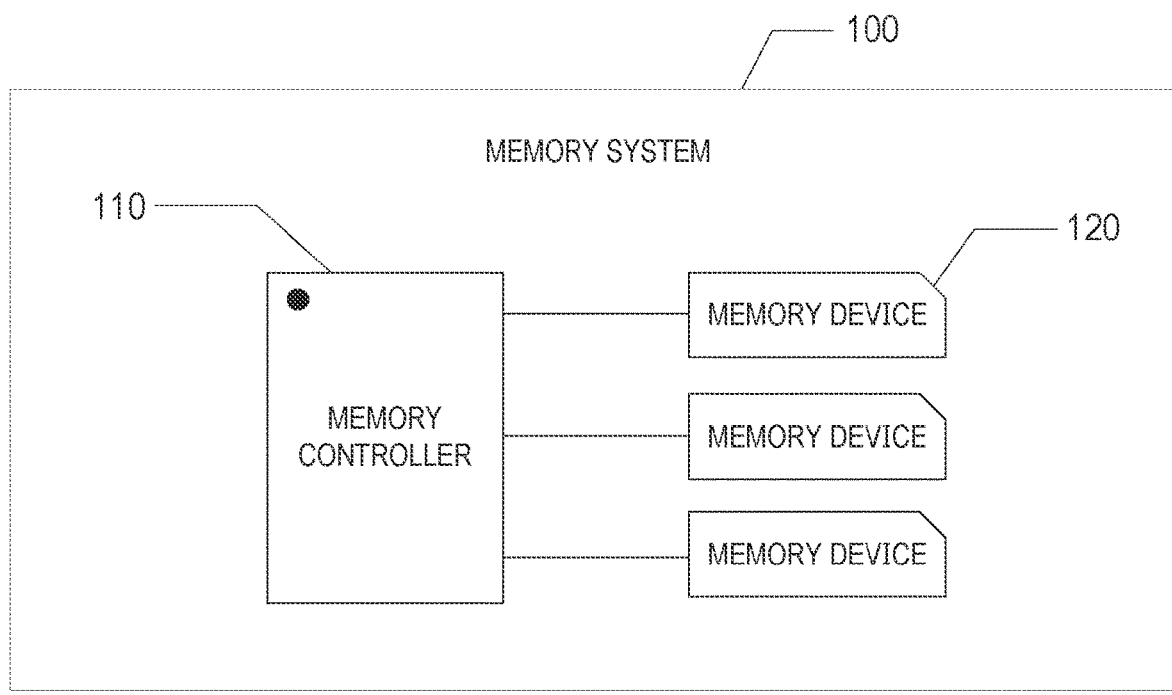
FIG. 3 is a schematic structural diagram of a memory system provided by an example of the present application.

An example of the present application as shown in FIG. 3 provides a memory system 100 including a memory device 120 and a memory controller 110 coupled to the memory device 120 for storing data to or reading data from the memory device 120. The memory system 100 can be applied and packaged into different types of electronic devices, for example, mobile phones (for example, cell phones), desktop computers, tablet computers, notebook computers, servers, vehicle-mounted equipment, game consoles, printers, positioning devices, wearable devices, smart sensors, mobile power supply, virtual reality (VR) devices, augmented reality (AR) devices, servers and any electronic device that can store data.

In some examples, the memory controller 110 may also perform any other suitable functions, such as formatting the memory device 120. For example, the memory controller 110 may communicate with external devices (e.g., a host) via at least one of various interface protocols. Interface protocols can include at least one of universal serial bus (USB) protocol, multimedia card (MMC) protocol, peripheral component interconnect (PCI) protocol, PCI Express (PCI-E) protocol, advanced technology attachment (ATA) protocol, serial ATA protocol, parallel ATA protocol, small computer system interface (SCSI) protocol, enhanced small disk interface (ESDI) protocol, or integrated drive electronics (IDE) protocol.

Figure 4:
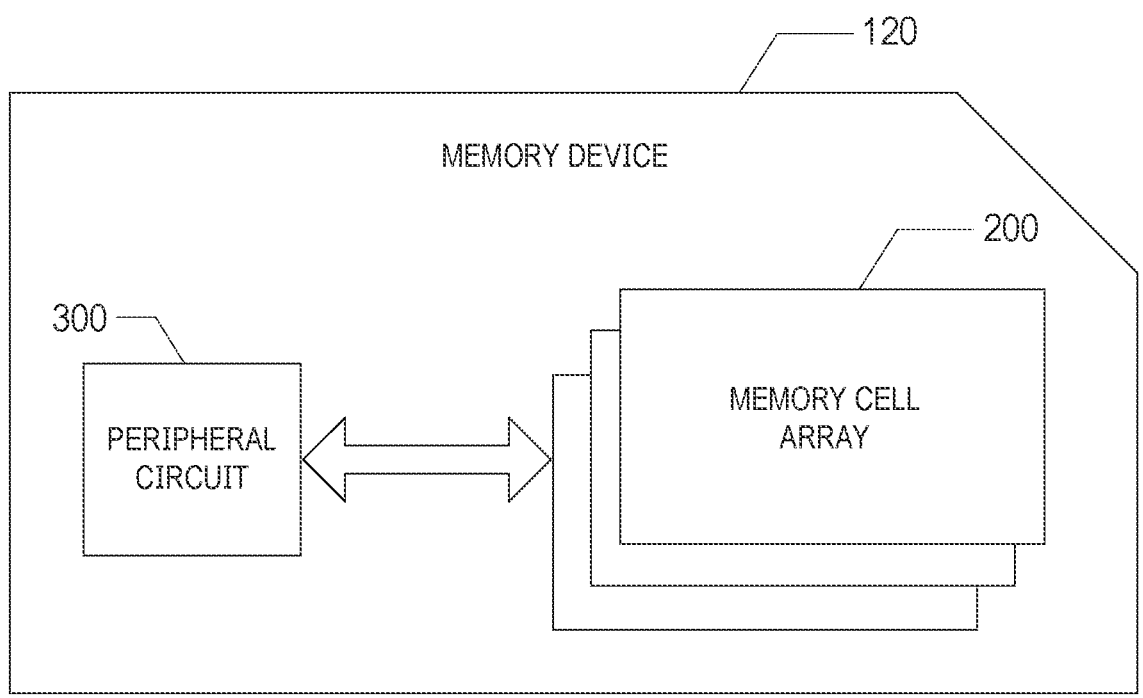
FIG. 4 is a schematic structural diagram of a memory device provided by an example of the present application.

The above-described memory device 120 as shown in FIG. 4 includes a memory cell array 200 and a peripheral circuit 300 coupled to the memory cell array 200 for controlling the memory cell array 200. The memory cell array 200 may include a plurality of memory cell blocks 210.

Figure 5:
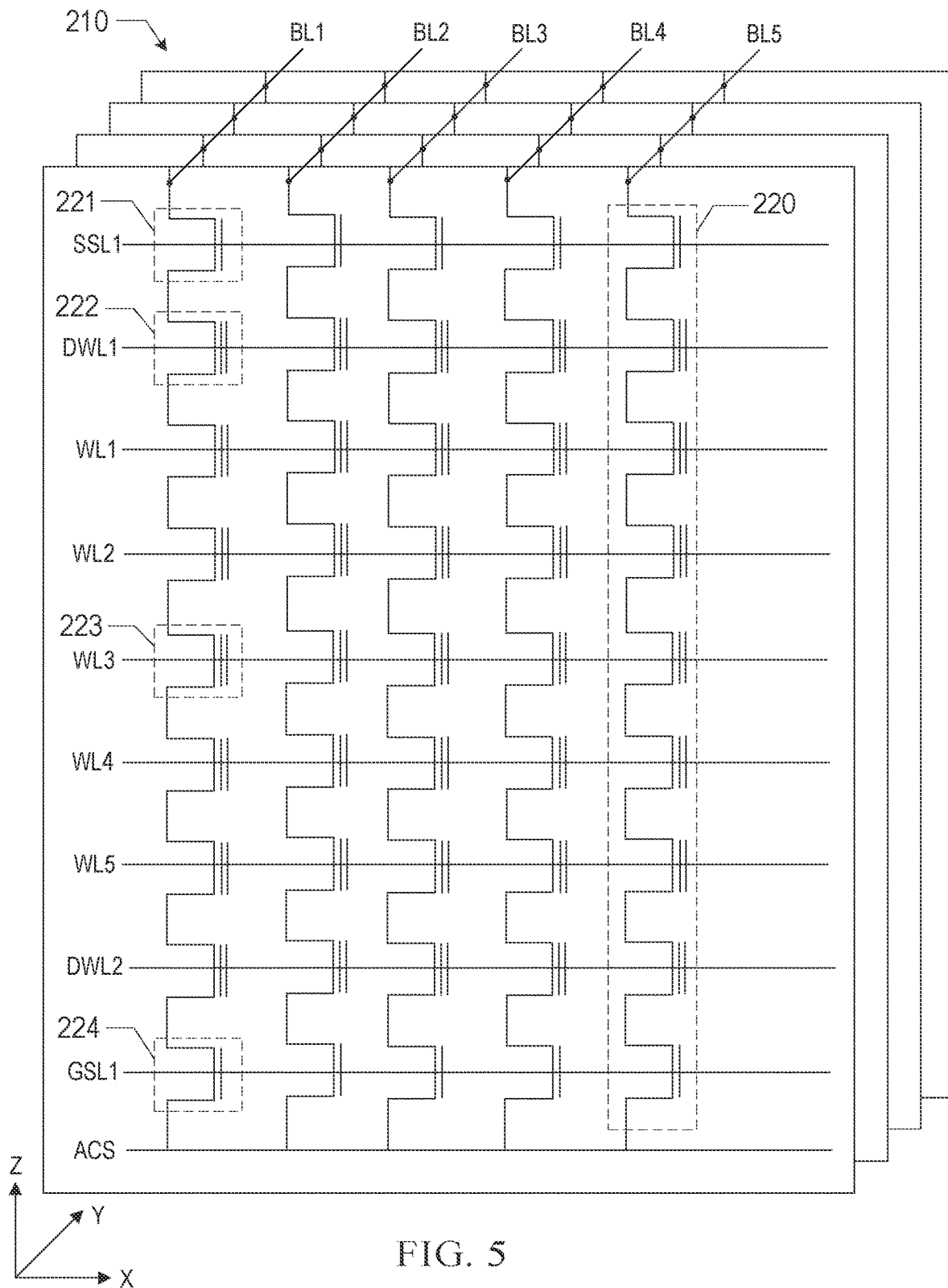
FIG. 5 is a schematic structural diagram of a memory cell block provided by an example of the present application.

As shown in FIG. 5, the memory cell block 210 may include multiple memory cell strings 220, and N memory cell strings 220 are arranged along an X-axis to form a memory cell slice (which may also be referred to as a memory cell group). M memory cell slices are arranged along a Y-axis to form a memory cell block 210. As an example, N=5, and M=4. Each memory cell string 220 may include a top select gate (TSG) 221, a dummy (DMY) memory cell 222, a plurality of memory cells 223, and a bottom select gate (BSG) 224 stacked in series along a Z-axis. The X-axis, Y-axis and Z-axis are horizontal axis, longitudinal axis and vertical axis of the space rectangular coordinate system respectively.

In the examples of the present application, the memory cell 223 in the NAND flash may be a device capable of storing data, such as a floating gate transistor or a charge trap type field effect transistor.

Figure 6:
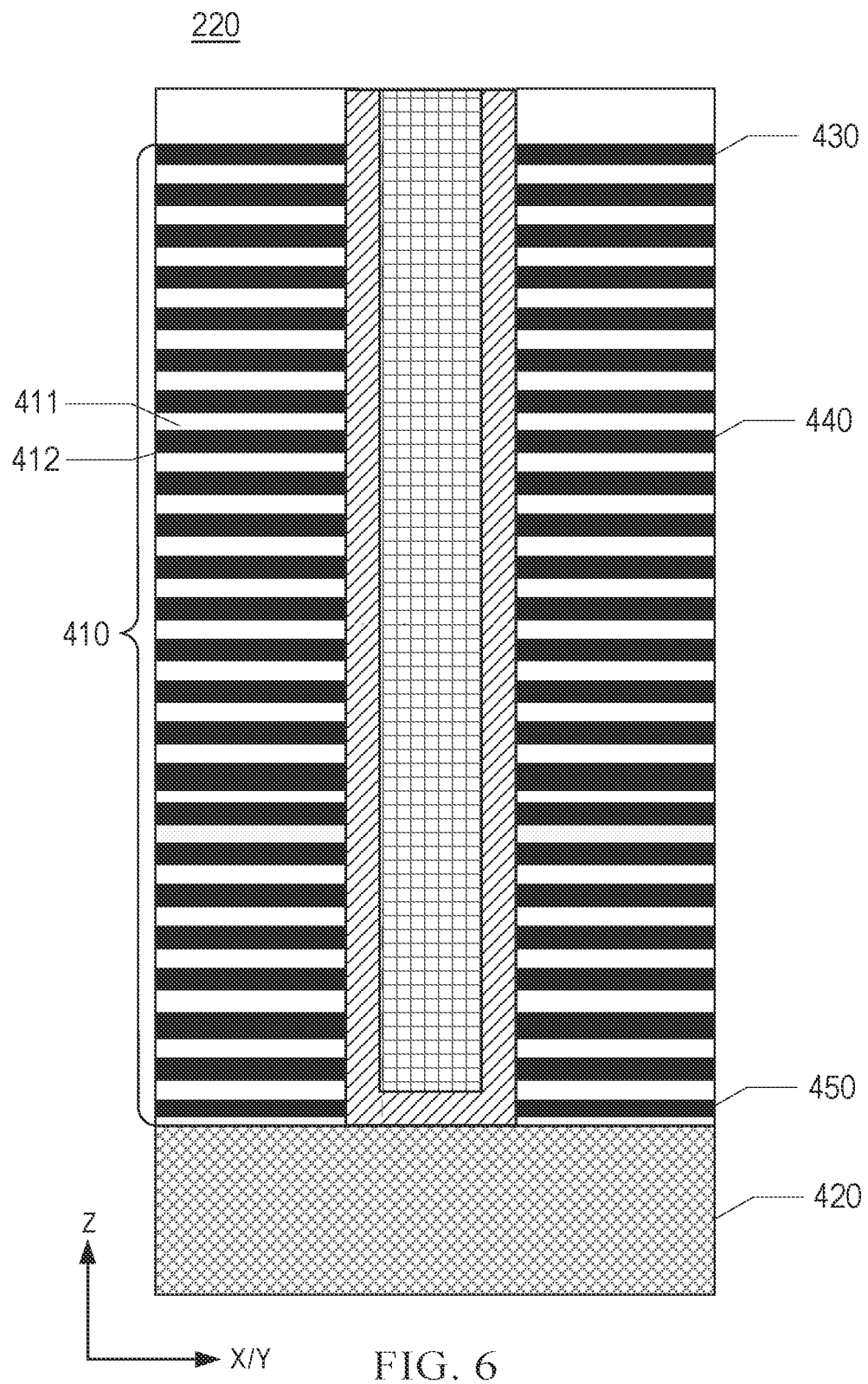
FIG. 6 is a partial cross-sectional view of a memory cell string provided by an example of the present application.

FIG. 6 shows a partial cross-sectional view of a memory cell string according to the present application. The memory cell string 220 may extend vertically through a memory stack layer 410 over a substrate 420. Substrate 420 may include silicon (e.g., monocrystalline silicon), silicon germanium (SiGe), gallium arsenide (GaAs), germanium (Ge), silicon on insulator (SOI), germanium on insulator (GOI), or any other suitable materials.

The memory stack layer 410 may include alternating gate conductive layers 411 and dielectric layers 412. The number of memory cells 223 in the memory cell string 220 may be determined by the number of gate conductive layers 411 and dielectric layers 412 in the memory stack layer 410.

The gate conductive layer 411 may include conductive materials including, but not limited to, tungsten (W), cobalt (Co), copper (Cu), aluminum (Al), polysilicon, doped silicon, silicide, or any combination thereof. In some examples, each gate conductive layer 411 includes a metal layer, such as a tungsten layer. In some examples, each gate conductive layer 411 includes a doped polysilicon layer. Each gate conductive layer 411 may include a control gate surrounding the memory cells 223. The gate conductive layer 411 at the top of the memory stack layer 410 may extend laterally as a string select line (SSL) 430, the gate conductive layer 411 at the bottom of the memory stack layer 410 may extend laterally as a ground select line (GSL) 450, or the gate conductive layer 411 between the string select line 430 and the ground select line 450 may extend laterally as a word line (WL) 440.

It should be understood that, although not shown in FIG. 6, additional components of memory cell string 220 may be formed, including but not limited to gate line slits/source contacts, local contacts, interconnect layers, etc.

Figure 7:
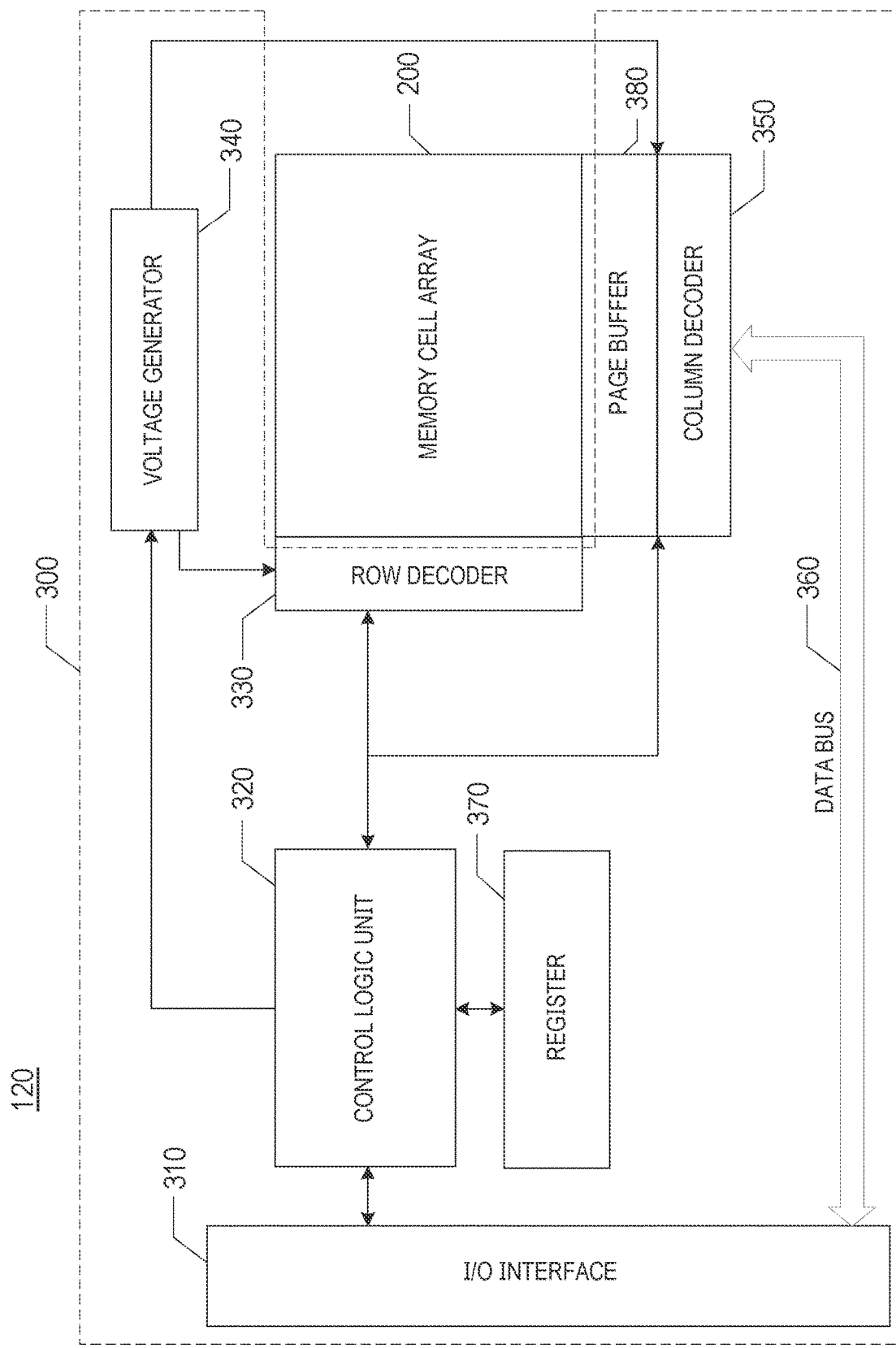
FIG. 7 is a schematic structural diagram of a memory device and a peripheral circuit provided by an example of the present application.

As shown in FIG. 7, the peripheral circuit 300 may include an I/O interface 310, a control logic 320, a row decoder 330, a voltage generator 340, a page buffer 380, a column decoder 350, a data bus 360 and a register 370. It should be understood that in some examples, additional circuits not shown in FIG. 7 may also be included. Memory cell array 200 may be coupled to the peripheral circuit 300 via bit lines, common source lines, string select lines, word lines, ground select lines, etc. For example, bit lines are coupled to the page buffer 380 and word lines are coupled to the row decoder 330.

The I/O interface 310 may be coupled to the control logic 320 and act as a control buffer to buffer and relay control commands received from the memory controller 110 (e.g., memory controller 110 in FIG. 3) to the control logic 320, and buffer and relay status information received from the control logic 320 to the memory controller 110. I/O interface 310 may also be coupled to a page buffer 380 via the data bus 360 and act as a data I/O interface 310 and a data buffer to buffer and relay data to or from the memory cell array 200.

The control logic 320 may be coupled to the voltage generator 340, the page buffer 380, the column decoder 350, the row decoder 330, the I/O interface 310 and the like, and be configured to control operations of various peripheral circuits 300. The control logic 320 may generate operation signals in response to a command (CMD) or a control signal from the memory controller 110 to control operations of the row decoder 330, the column decoder 350, the page buffer 380, and the voltage generator 340. The command may be a program command, a read command, etc.

The voltage generator 340 may use an external power supply voltage or an internal power supply voltage to generate various voltages for performing operations such as erase, program, read, and verify on the memory cell array 200, such as a program voltage Vpgm, a pass voltage Vpass, a read voltage Vread, a verification voltage Vvfy and the like applied to the word lines, and a program inhibit voltage Vinhibit, a program select voltage Vss and the like applied to the bit lines, and combinations thereof.

The row decoder 330 may supply the word line voltage generated from the voltage generator 340 to the word lines of the memory cell array 200 in response to operation signals of the control logic 320. As described in detail below, the row decoder 330 is configured to perform program operations on memory cells coupled to one or more word lines in the memory cell array 200.

The column decoder 350 may select one or more memory cell strings 220 in memory cell array 200 in response to operation signals of the control logic 320.

The page buffer 380 may read data from and program (write) data to the memory cell array 200 according to a control signal from the control logic 320. In one example, the page buffer 380 may store program data (write data) to be programmed into the memory cell array 200. In another example, page buffer 380 may perform a program verification operation to ensure that data has been correctly programmed into memory cells 223 coupled to the selected word lines. In yet another example, the page buffer 380 may also detect low power signals from bit lines representing data bits stored in memory cells 223 and amplify small voltages to recognizable logic levels during read operations.

The register 370 may be coupled to the control logic 320 and include status registers, command registers and address registers for storing status information, command operation codes (OP codes) and command addresses for controlling the operations of each peripheral circuit 300.

Those skilled in the art should understand that the operations performed by the row decoder 330, the page buffer 380, the control logic 320, and the voltage generator 340 described in this application may be performed by a processing circuit. The processing circuit may include, but is not limited to, hardware of a logic circuit or a hardware/software combination of a processor executing software.

Figure 8:
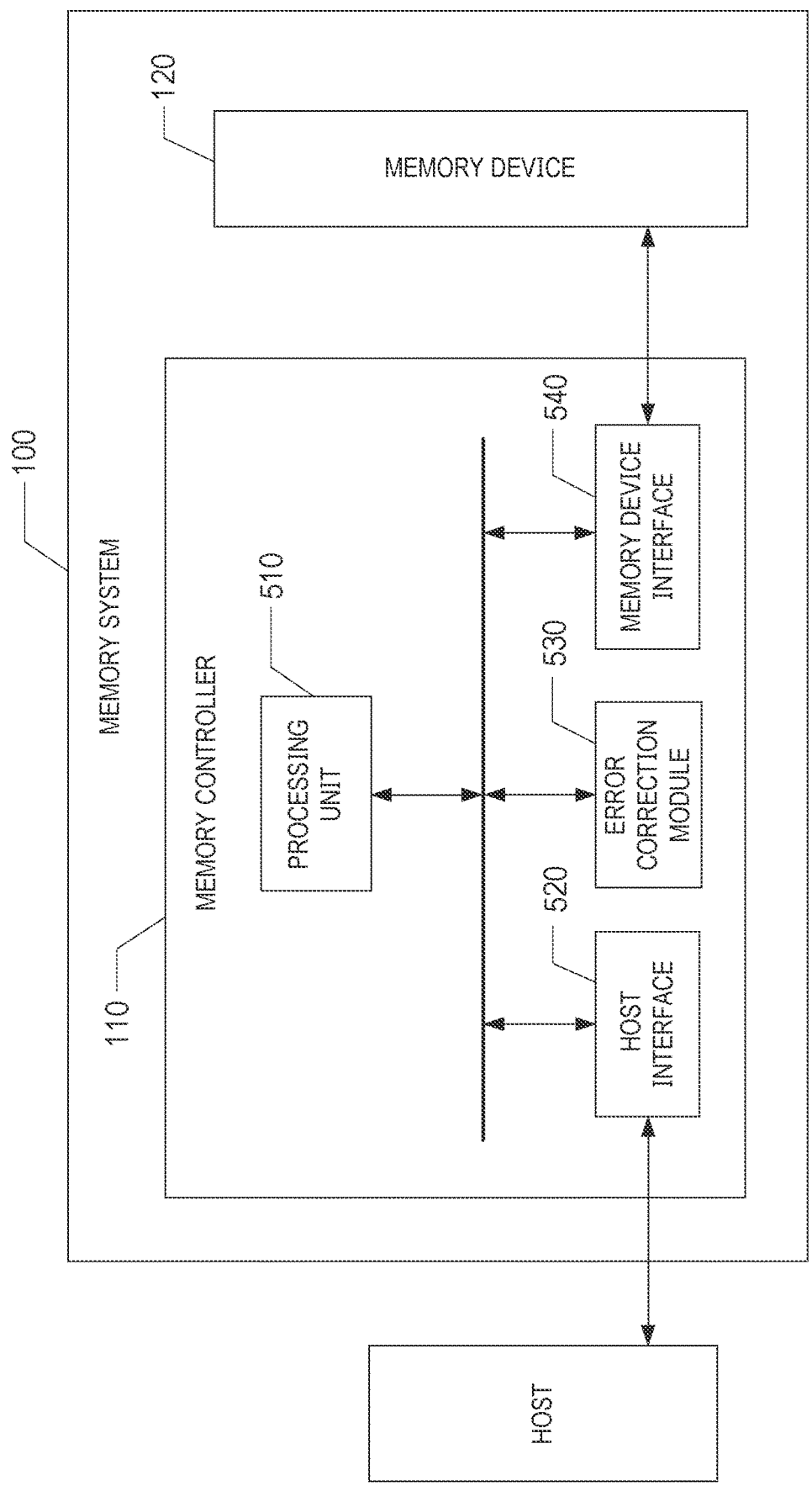
FIG. 8 is a schematic structural diagram of a memory controller provided by an example of the present application.

As shown in FIG. 8, the above memory controller 110 may include a host interface 520, a memory device interface 540, a processing unit 510, and an error correction module 530. In some examples, the memory controller 110 may be further provided with other components, such as a read-only memory (ROM) (not shown) that stores encoded data for connection to the host interface 520.

The processing unit 510 may control the overall operations (e.g. write, read, file system management) for the memory device. In some examples, the processing unit 510 may further be equipped with multiple central processing units (CPU) to allow multitasking and high-speed parallel processing.

The host interface 520 provides an interface for communicating with a host. As an example, the processing unit 510 may receive commands through the host interface 520, and then perform operations to process the received commands. The memory device interface 540 provides an interface for communicating with a memory device. In the examples, the memory device interface 540 may be implemented based on a NAND interface.

The error correction module 530 detects and corrects data read errors read out from the memory device 120. The error correction module 530 may be used to generate parity check codes such as a Richard Hamming code, low density parity check code (LDPC) and the like based on the bit logic state of the written data, wherein the parity check codes are associated with the written data. The parity check codes are then utilized in a read operation to detect and correct errors in the data when the data is read out from the memory device 120.

The processing unit 510 may send a read instruction to the memory device 120 through the memory device interface 540, wherein the read instruction may be configured to read data from a memory cell page coupled to the first word line and receive data read out by the memory device 120 from the memory cell page through the memory device interface 540. Then, the error correction module 530 decodes the data, locates the bits in which an error occurs in the data and corrects the bits in which the error occurs, so as to obtain the number of the read failure bits of the memory cell page coupled to the first word line and the error corrected data of the memory cell page. The processing unit 510 may send the error corrected data to the host through the host interface 520.

In some examples, the number of read failure bits of the memory cell page coupled to the first word line may be cached in a cache module (not shown) of the memory controller 110. When data is read from the memory cell page coupled to the first word line, the number of read failure bits cached by the cache module may be updated. The processing unit 510 may be configured to periodically acquire the number of read failure bits of a memory cell page coupled to the first word line from the cache module according to a preset time rule, and determine whether the number of read failure bits is greater than a preset threshold. When the number of read failure bits is greater than the preset threshold value, the processing unit 510 controls the memory device 120 to perform a reprogram operation on the memory cell page.

In other examples, when reading data from the memory cell page coupled to the first word line, the error correction module 530 obtains the number of read failure bits of the memory cell page coupled to the first word line, the processing unit 510 determines whether the number of read failure bits is greater than a preset threshold. When the number of read failure bits is greater than a preset threshold value, the processing unit 510 controls the memory device 120 to perform a reprogram operation on the memory cell page.

Figure 9:
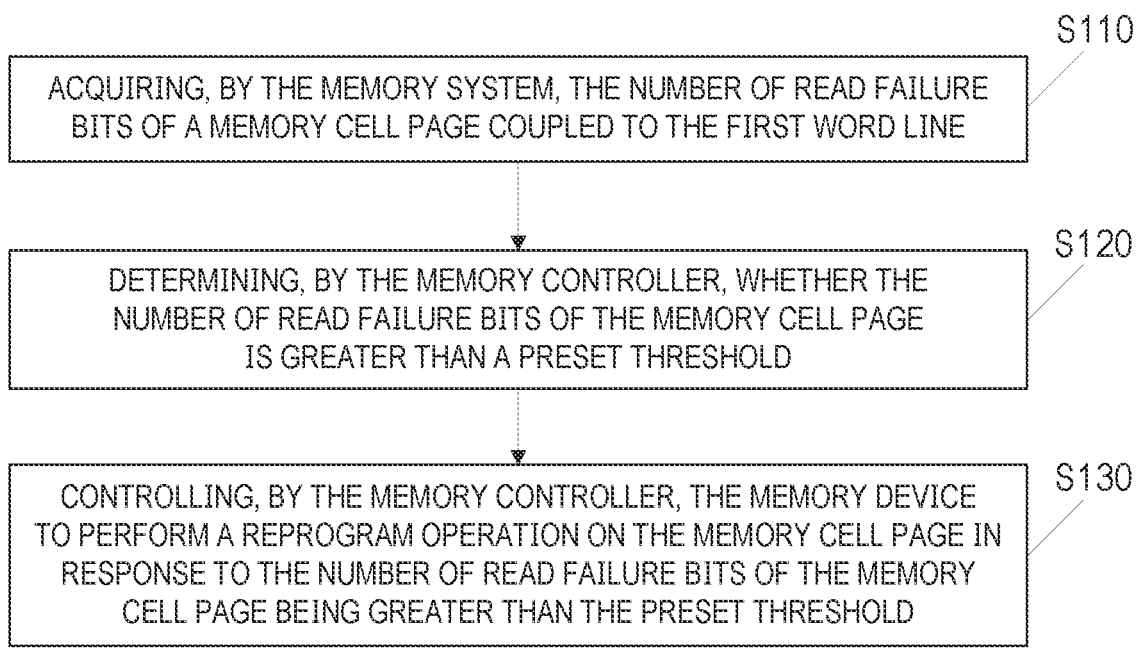
FIG. 9 is a flow diagram of an operating method of a memory system provided by an example of the present application.

The present application provides an operating method of a memory system, as shown in FIG. 9, comprising:

S110. acquiring, by the memory system, the number of read failure bits of a memory cell page coupled to the first word line.

In some examples, the memory system 100 may determine whether there is an error in encoded data (e.g. Hamming code, low density parity check code, etc.) read out from a memory cell page coupled to the first word line by performing parity detection on the encoded data by the error correction module 530, and determine the locations where the error occurs on the encoded data (i.e., determine the number of read failure bits) within the error correction capability (i.e., when the number of read failure bits is less than or equal to a certain threshold) and make correction. The parity detection is to sum all bits, and output "1" if the sum result is odd, output "0" if the sum result is even, then determine whether there is an error in the data and determine the bits in which the error occurs in the data according to the output result.

Figure 10:
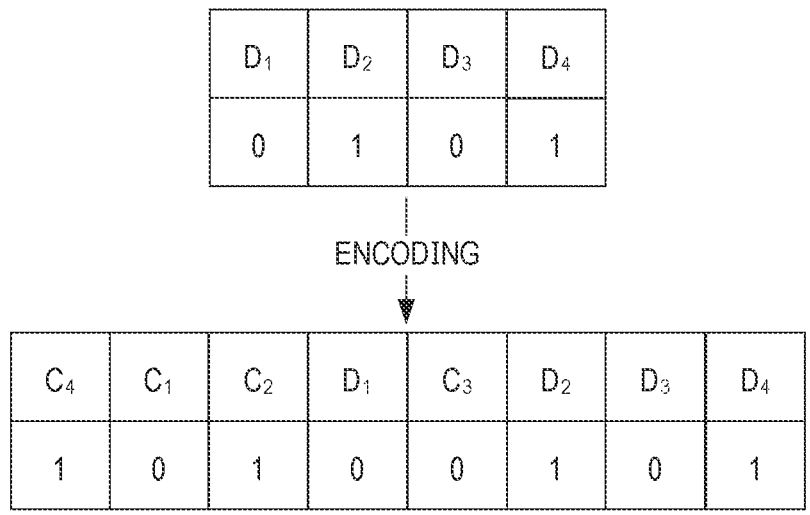
FIG. 10 is a schematic diagram of an encoding result of data encoded by an error correction module provided by an example of the present application.

As an example, when memory system 100 needs to store 4-bit data "$D_1D_2D_3D_4$", the error correction module 530 generates 3 parity check codes according to the encoding rules of Hamming code. The first parity check code $C_1$ is determined by the parity of $D_1$, $D_2$ and $D_4$; the second parity check code $C_2$ is determined by the parity of $D_1$, $D_3$ and $D_4$; the third parity check code $C_3$ is determined by the parity of $D_2$, $D_3$ and $D_4$; and the fourth parity code $C_4$ is then generated, which is determined by the parity of $D_1$, $D_2$, $D_3$, $D_4$, $C_1$, $C_2$ and $C_3$. As shown in FIG. 10, if "$D_1D_2D_3D_4$" is "0101", it can be calculated that $C_1$ is 0 (0+1+1=0), $C_2$ is 1 (0+0+1=1), $C_3$ is 0 (1+0+1=0), $C_4$ is 1 (0+1+0+1+0+1+0=1) according to the encoding rules of Hamming code. It should be understood that the calculation in parity check code encoding and decoding is a logical operation of parity rather than a mathematical operation. That is, the error correction module 530 encodes the data "0101" into Hamming code data "10100101". The processing unit 510 assigns a physical address for the Hamming code data "10100101", i.e., determines which memory cell page(s) the Hamming code data "10100101" is written to, sends a program instruction and the Hamming code data "10100101" to the memory device 120 through the memory device interface 540, thus controlling the memory device 120 to write the Hamming code data "10100101" to a plurality of memory cells in the memory cell page.

Figure 11:
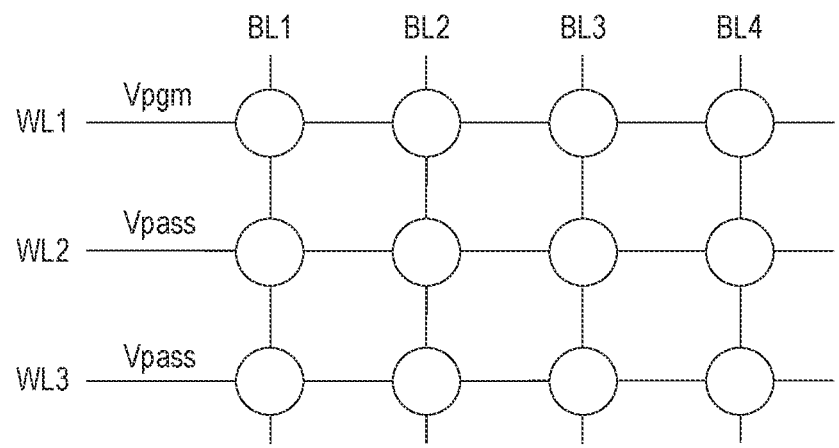
FIG. 11 is a schematic diagram of a program operation on a memory cell page performed by a memory device provided by an example of the present application.

As an example, this application is further explained by taking the memory cell in the memory device 120 being an MLC as an example. The memory cell page (physical page)

of the MLC includes a logical up page and a logical low page. When the memory device 120 programs the memory cell page, "1010" may be programmed into the logical up page and "0101" may be programmed into the logical low page. As shown in FIG. 11, the four memory cells (from left to right in FIG. 11) in a memory cell page coupled to a word line WL1 are respectively programmed into a P1 state, a P2 state, a P1 state and a P2 state, by applying a program voltage Vpgm to the word line WL1, a pass voltage Vpass to the word lines WL2 and WL3, and a program select voltage or a program inhibit voltage to the bit lines BL1, BL2, BL3 and BL4.

When the memory controller 110 controls the memory device 120 to read out the Hamming code data from the memory cell page coupled to the first word line, the error correction module 530 performs decoding error correction on the Hamming code data through a decoding operation, and the decoding error correction process is as follows: detecting parity of $C_4$, $C_1$, $C_2$, $D_1$, $C_3$, $D_2$, $D_3$ and $D_4$; detecting parity of $C_3$, $D_2$, $D_3$ and $D_4$, parity of $C_2$, $D_1$, $D_3$ and $D_4$, parity of $C_1$, $D_1$, $D_2$ and $D_4$ in sequence.

TABLE 1

| $C_4$ | $C_1$ | $C_2$ | $D_1$ | $C_3$ | $D_2$ | $D_3$ | $D_4$ |
|---|---|---|---|---|---|---|---|
| 1 | 0 | 1 | 0 | 0 | 1 | 0 | 1 |

For example, as shown in Table 1 above, if the Hamming code data read out by the memory controller 110 from the memory cell page coupled to the first word line is "10100101", the error correction module 530 obtains "0" by detecting the parity of $C_4$, $C_1$, $C_2$, $D_1$, $C_3$, $D_2$, $D_3$ and $D_4$ (1+0+1+0+0+1+0+1=0), and obtains "000" by detecting the parity of $C_3$, $D_2$, $D_3$ and $D_4$ (0+1+0+1=0), the parity of $C_2$, $D_1$, $D_3$ and $D_4$ (1+0+0+1=0), the parity of $C_1$, $D_1$, $D_2$ and $D_4$ (0+0+1+1=0) in sequence. Among them, "0" means that the Hamming code data is correct; the binary value composed of "000" represents location where the error occurs in the Hamming code data, and "000" is transformed from the binary value to decimal "0", which represents the error occurs in the $0^{th}$ bit of the Hamming code data ($C_4$).

Since the $0^{th}$ bit is the detection bit for determining whether an error occurs in the Hamming code data, when the error correction module 530 obtains "0" and "000" by parity detection, it means that the Hamming code data is correct, and the number of read failure bits of the memory cell page coupled to the first word line obtained by the memory system 100 through the error correction module 530 is zero. Finally, a for-bit data "$D_1D_2D_3D_4$" may be obtained by reading the third, fifth, sixth and seventh bits of the Hamming code data.

TABLE 2

| $C_4$ | $C_1$ | $C_2$ | $D_1$ | $C_3$ | $D_2$ | $D_3$ | $D_4$ |
|---|---|---|---|---|---|---|---|
| 1 | 0 | 1 | 0 | 0 | 1 | 1 | 1 |

As an example, as shown in Table 2 above, if the Hamming code data read out by the memory controller 110 from the memory cell page coupled the first word line is "10100111", the error correction module 530 obtains "1" by detecting the parity of $C_4$, $C_1$, $C_2$, $D_1$, $C_3$, $D_2$, $D_3$ and $D_4$ (1+0+1+0+0+1+1+1=1), and obtains "110" by detecting the parity of $C_3$, $D_2$, $D_3$ and $D_4$ (0+1+1+1=1), the parity of $C_2$, $D_1$, $D_3$ and $D_4$ (1+0+1+1=1), the parity of $C_1$, $D_1$, $D_2$ and $D_4$ (0+0+1+1=0) in sequence. Among them, "1" means that an error occurs in the Hamming code data; the binary value composed of "110" represents location where the error occurs in the Hamming code data, and "110" is transformed from the binary value to decimal "6", which represents the error occurs in the 6th bit of the Hamming code data ($D_3$).

At this time, the number of read failure bits of the memory cell page coupled to the first word line obtained by the memory system 100 through the error correction module 530 is 1. The error correction module 530 automatically corrects the error "1" in the $6^{th}$ bit to "0" after discovering the error in the bits. Then, the 4-bit data "$D_1D_2D_3D_4$" may be obtained by reading the third, fifth, sixth and seventh bits of Hamming code data.

TABLE 3

| $C_4$ | $C_1$ | $C_2$ | $D_1$ | $C_3$ | $D_2$ | $D_3$ | $D_4$ |
|---|---|---|---|---|---|---|---|
| 1 | 0 | 1 | 1 | 0 | 1 | 0 | 0 |

As an example, as shown in Table 3 above, if the Hamming code data read out by the memory controller 110 from the memory cell page coupled to the first word line is "10110100", the error correction module 530 obtains "0" by detecting the parity of $C_4$, $C_1$, $C_2$, $D_1$, $C_3$, $D_2$, $D_3$ and $D_4$ (1+0+1+1+0+1+0+0=0), and obtains "100" by detecting the parity of $C_3$, $D_2$, $D_3$ and $D_4$ (0+1+0+0=1), the parity of $C_2$, $D_1$, $D_3$ and $D_4$ (1+1+0+0=0), and the parity of $C_1$, $D_1$, $D_2$ and $D_4$ (0+1+1+0=0). Among them, "0" means that the Hamming code data is correct; the binary value composed of "100" represents location where the error occurs in the Hamming code data, and "100" is transformed from the binary value to decimal "4", which represents the error occurs in the $4^{th}$ bit of the Hamming code data ($C_3$). At this time, the parity check is contradictory, thus the error correction module 530 cannot locate the location of the error. The number of read failure bits of the memory cell page coupled to the first word line obtained by decoding of the error correction module 530 by the memory system 100 is more than one, which exceeds the error correction capability of the error correction module 530.

Figure 12:
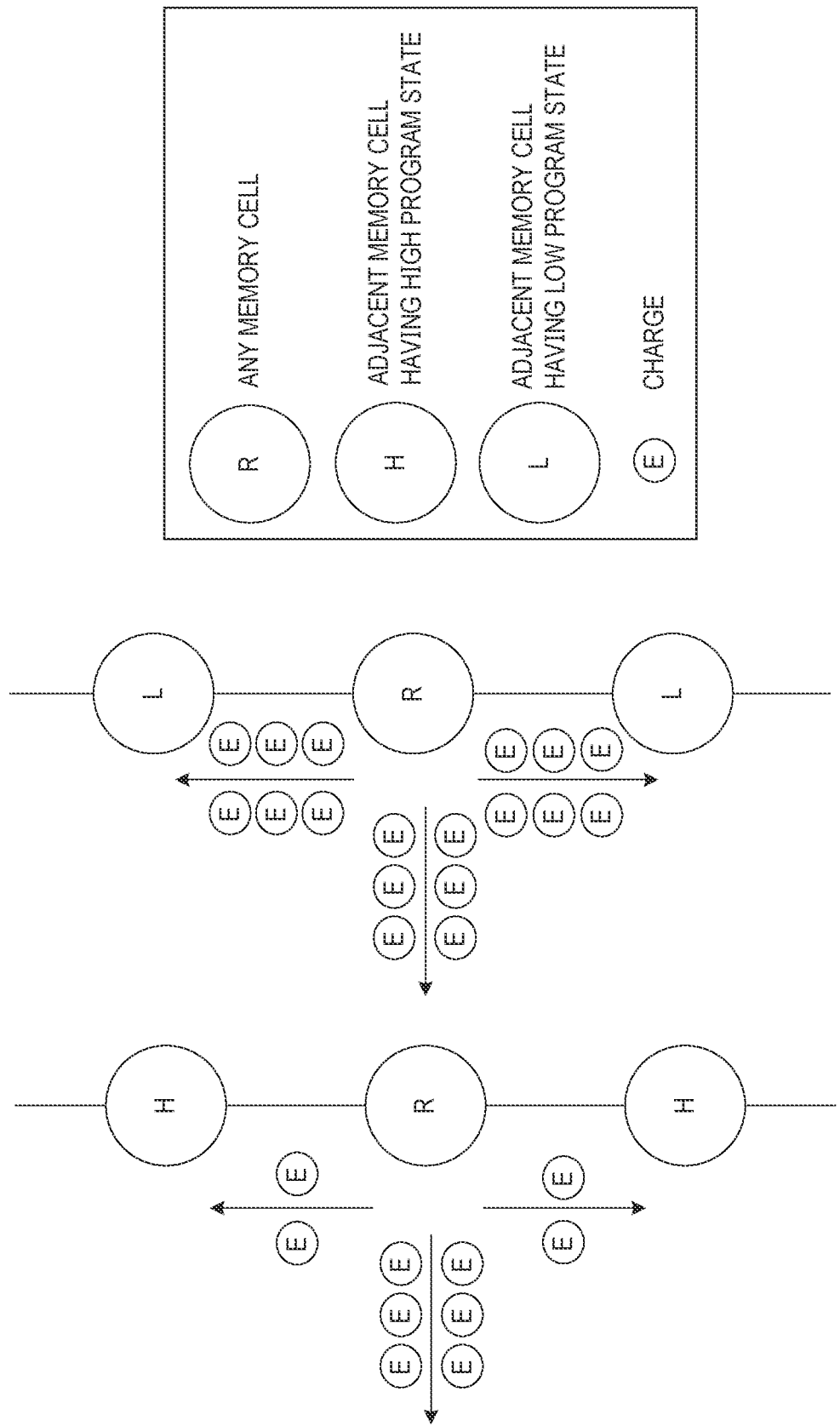
FIG. 12 is a schematic diagram of the results of the effect of the program states of adjacent memory cells on the lateral charge loss of any memory cell provided by an example of the present application.

In some examples, the memory device 120 further comprises a second word line, wherein a plurality of memory cells coupled to the second word line are in an unprogrammed erase state, and the first word line is adjacent to the second word line. The charge loss of memory cell mainly includes vertical charge loss and lateral charge loss. The lateral charge loss is related not only to the threshold voltage of the memory cell but also to the program state of adjacent memory cells of the memory cell. The adjacent memory cells are coupled to the same bit line as the memory cell. As shown in FIG. 12, for any memory cell, the lateral charge loss of the memory cell is smaller when the adjacent memory cells are in the high program state, and the lateral charge loss of the memory cell is larger when the adjacent memory cells are in the low program state, that is, the data stored in the memory cell page coupled to the first word line is more prone to have errors. Therefore, performing a reprogram operation on the memory cell coupled to the first word line may reduce the data errors and improve the reliability of the memory system 100 more effectively.

It should be understood that there are a plurality of first word lines. For example, the first word line may be one or more word lines adjacent to the second word line.

S120. Determining, by the memory controller, whether the number of read failure bits of the memory cell page is greater than a preset threshold.

In some examples, the preset threshold may be set according to the error correction capability of the error correction module 530. As an example, if the error correction module 530 may correct encoded data with the number of read failure bits not greater than five (i.e., the number of locations of where an error occurs in the encoded data is no more than five), then the preset threshold may be set to three.

S130. controlling, by the memory controller, the memory device to perform a reprogram operation on the memory cell page in response to the number of read failure bits of the memory cell page being greater than the preset threshold.

Figure 13:
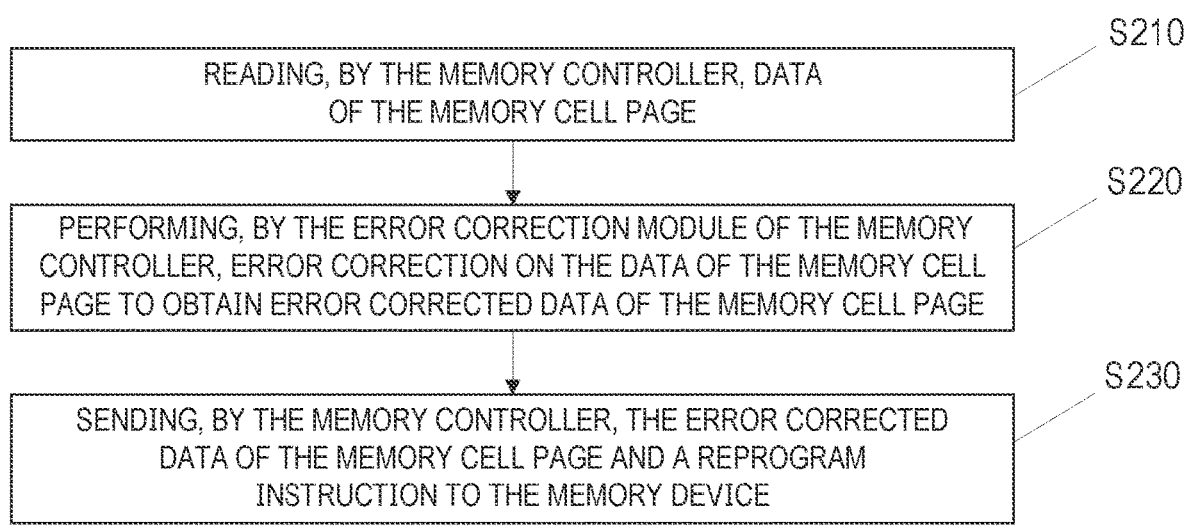
FIG. 13 is a flow diagram of a reprogram operation performed by the memory controller provided by an example of the present application.

As shown in FIG. 13, the reprogram operation comprises:

S210. reading, by the memory controller, data of the memory cell page.

Figure 14:
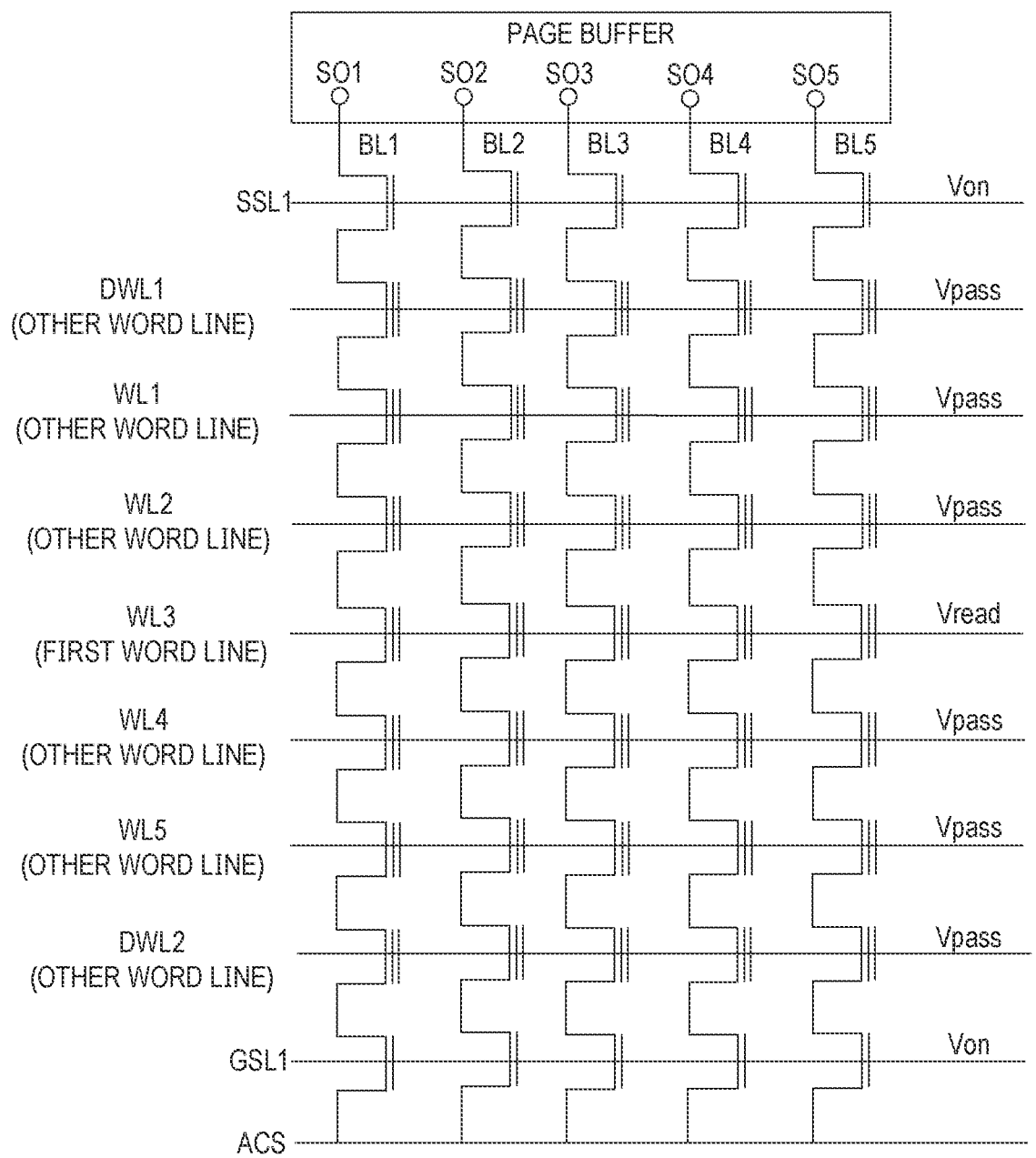
FIG. 14 is a schematic diagram of applying a word line voltage for performing a read operation on a memory cell provided by an example of the present application.

In some examples, the memory controller 110 sends a read instruction to the memory device 120. As shown in FIG. 14, the control logic 320 of the memory device 120 controls the voltage generator 340 to charge bit lines (BL) coupled to the memory cell page and a sensing node (SO) in a corresponding page buffer 380 in response to the read instruction. After that, the voltage generator 340 may be controlled to apply a turn-on voltage Von to the selected line coupled to the memory cell page, apply a read voltage Vread to the word line (i.e., the first word line) coupled to the memory cell 223, and apply a pass voltage Vpass to other word lines other than the first word line.

Figure 15:
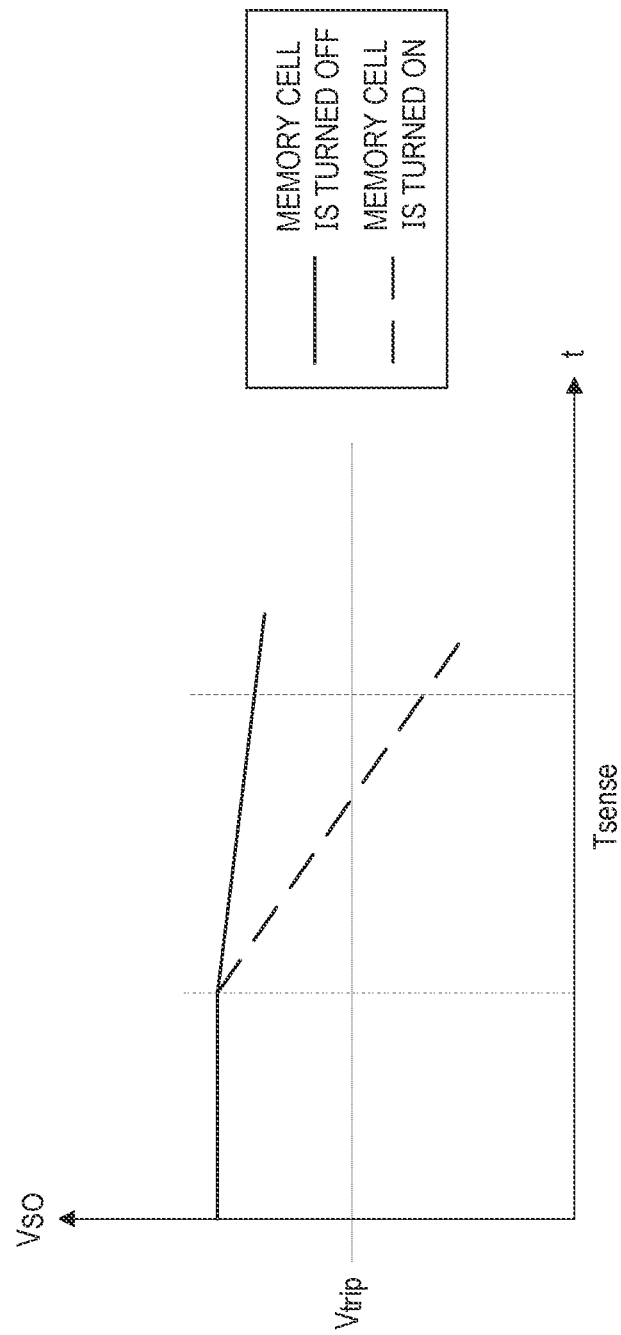
FIG. 15 is a schematic diagram of determining a read result of performing a reading operation on a memory cell according to an example of the present application.

As shown in FIG. 15, the state of the memory cell is obtained by comparing the magnitudes of the voltage Vso of the sensing node and the trip voltage Vtrip after the sensing duration Tsense has elapsed. As an example, if the voltage Vso of the sensing node is greater than the trip voltage Vtrip, it indicates that the memory cell to be read is turned off (the discharge loop of the sensing node is turned off and the sensing node cannot discharge), i.e., the threshold voltage Vt is greater than the read voltage Vread. At this time, the memory device 120 sends data "0" to the memory controller 110. Similarly, if the voltage Vso of the sensing node is less than the trip voltage Vtrip, it indicates that the memory cell to be read is turned on (the discharge loop of the sensing node is turned on and the sensing node discharges), i.e., the threshold voltage Vt is less than the read voltage Vread. At this time, the memory device 120 sends data "1" to the memory controller 110.

S220. performing, by the error correction module of the memory controller, error correction on the data of the memory cell page to obtain error corrected data of the memory cell page.

In some examples, the memory controller 110 performs error correction by the error correction module 530 after reading data among the data of the memory cell page. The error correction process performed by the error correction module 530 is described above, and is not repeated herein.

S230. sending, by the memory controller, the error corrected data of the memory cell page and a reprogram instruction to the memory device.

Figure 16:
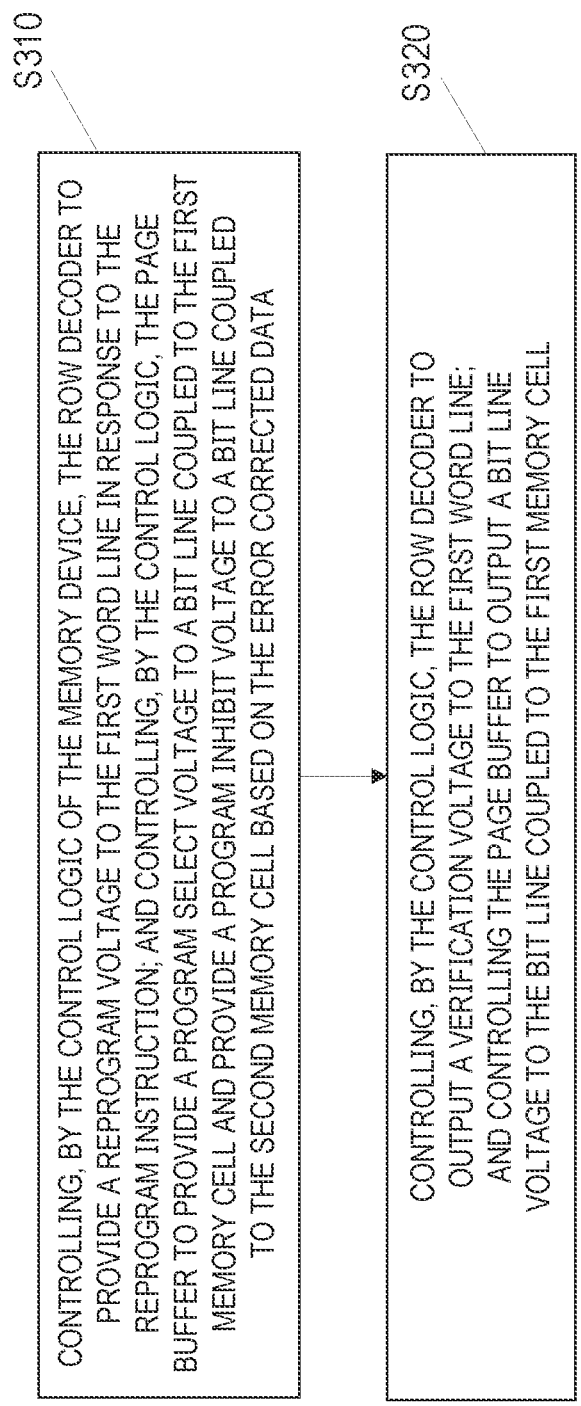
FIG. 16 is a flow diagram of a reprogram operation performed by the memory device provided by an example of the present application.

In some examples, after the memory device 120 receives the error corrected data of the memory cell page and the reprogram instruction, the operations S310-S320 shown in FIG. 16 are performed as follows:

S310. controlling, by the control logic of the memory device, the row decoder to provide a reprogram voltage to the first word line in response to the reprogram instruction; and controlling, by the control logic, the page buffer to provide a program select voltage to a bit line coupled to the first memory cell and provide a program inhibit voltage to a bit line coupled to the second memory cell based on the error corrected data.

In some examples, the vertical charge loss is related to the threshold voltage of the memory cell. The larger the threshold voltage is, the more severe the vertical charge loss of the memory cell is. The threshold voltage of the first memory cell is higher than the threshold voltage of the second memory cell. Therefore, during the reprogram operation, a program select voltage is provided to a bit line coupled to the first memory cell to program the first memory cell, thereby weakening or even eliminating a threshold voltage offset of the first memory cell caused by charge loss; and a program inhibit voltage is output to a bit line coupled to the second memory cell, so as to prevent programming of the second memory cell to prevent over-programming of the second memory cell.

In some examples, an initial value of the reprogram voltage is greater than an initial value of an original program voltage. The second memory cell having a low threshold voltage needs not to be programmed. Setting an initial value of the reprogram voltage to be larger than an initial value of the original program voltage saves time required for a reprogram operation.

S320. controlling, by the control logic, the row decoder to output a verification voltage to the first word line; and controlling the page buffer to output a bit line voltage to the bit line coupled to the first memory cell.

Figure 17:
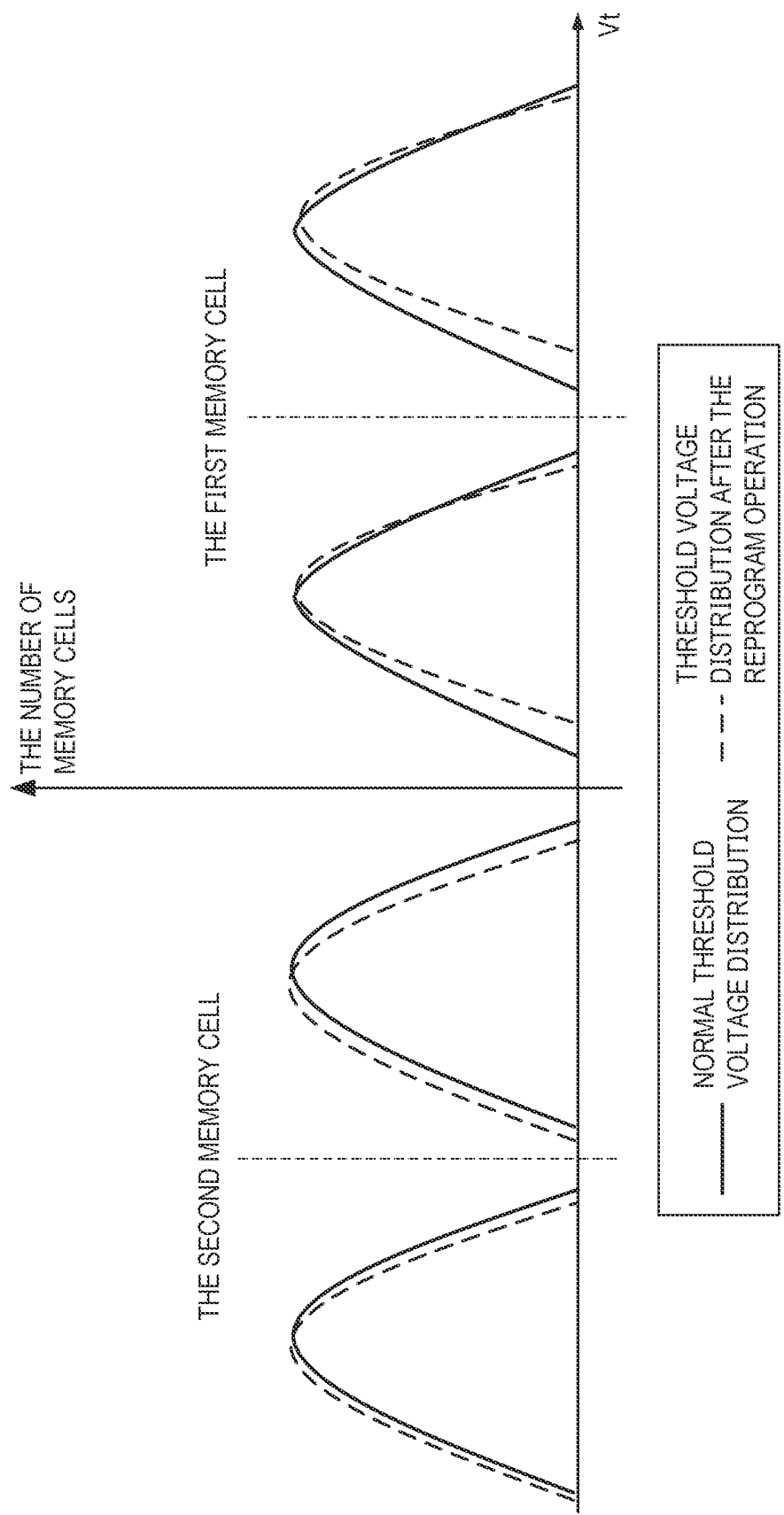
FIG. 17 is a schematic diagram comparing the normal threshold voltage distribution and the threshold voltage distribution after the reprogram operation provided by an example of the present application.

As shown in FIG. 17, the threshold voltage offset of the first memory cell due to charge loss or the like is weakened or even eliminated after the reprogram operation. Therefore, during a read operation, even if there are a small number of bits in the readout data where an error occurs, correct data can be read out after error correction by the ECC algorithm. Compared with the data refresh operation in other solutions, in the present application, by performing a reprogram operation on the memory cell page coupled to the first word line, the number of times the memory device 120 is erased may be reduced, thus reducing the wear of the memory device 120 and improving the service life of the memory system 100 to a certain extent.

The examples of the present application further provide a computer-readable storage medium that stores computer-executable instructions, which, when executed, can implement the operations in the above method example, for example, performing the method as shown in FIGS. 9, 13 and 16.

The examples of the present application provide a computer device, comprising a processor, and a readable storage medium coupled to the processor. The readable storage medium stores executable instructions that, when executed by the processor, can implement the operations in the above method example, for example, performing the method as shown in FIGS. 9, 13 and 16.

In the memory system and an operating method of the memory system provided by the examples of the present application, when the number of read failure bits (i.e., the number of bits in which an error occurs in the data) of the memory cell page coupled to the first word line is greater than a preset threshold value, the reprogram operation is performed on the memory cell page coupled to the first word line so as to weaken or even eliminate the threshold voltage offset of the programmed memory cell. Therefore, during a read operation, even there are a small number of bits in the readout data where an error occurs, correct data can be read out after error correction by the ECC algorithm. Compared with the data refresh operation in other solutions, in the present application, by performing a reprogram operation on the memory cell page coupled to the first word line, the number of times the memory device 120 is erased may be reduced, thus reducing the wear of the memory device 120 and improving the service life of the memory system 100 to a certain extent.

Those skilled in the art can clearly understand that the descriptions of each of the above-mentioned examples has its own focus for the convenience and brevity of description, and the parts that are not described in detail in a certain example can be referred to the corresponding process in the aforementioned method example and will not be repeated herein.

It should be understood that in the various examples of the present application, the magnitude of the sequence numbers of the above-mentioned processes does not mean the order of execution. The execution order of each process should be determined by its functions and internal logic, and should not constitutes any limitation to example process of the present application.

Those skilled in the art can appreciate that the modules and algorithm operations of the examples described in conjunction with the examples disclosed herein can be implemented in electronic hardware, or a combination of computer software and electronic hardware. Whether these functions are implemented in hardware or software depends on the application and design constraints of the technical solution. Skilled artisans may use different methods to implement the described functions for each application, but such example should not be regarded as going beyond the scope of the present application.

The above description is only an example of the present disclosure, but the scope of protection of the present disclosure is not limited thereto. Any changes or substitutions that can be easily conceived by those skilled in the art within the technical scope disclosed in the present disclosure shall be encompassed within the protection scope of the present disclosure. Therefore, the protection scope of the present disclosure should be determined by the protection scope of the claims.

What is claimed is:

1. A memory system, comprising:
a memory device comprising a first word line, a control logic, a row decoder, and a page buffer; and
a memory controller coupled to the memory device and configured to:
acquire a number of read failure bits of a memory cell page coupled to the first word line, wherein the memory cell page comprises a first memory cell and a second memory cell;
determine whether the number of read failure bits of the memory cell page is greater than a preset threshold; and
control the memory device to perform a reprogram operation on the memory cell page in response to the number of read failure bits of the memory cell page being greater than the preset threshold,
wherein the control logic is configured to:
control the row decoder to provide a reprogram voltage to the first word line in response to a reprogram instruction; and
control the page buffer to provide a program select voltage to a bit line coupled to the first memory cell and output a program inhibit voltage to a bit line coupled to the second memory cell based on error corrected data of the memory cell page, wherein a threshold voltage of the first memory cell is higher than a threshold voltage of the second memory cell.

2. The memory system of claim 1, wherein the memory device further comprises a second word line, the first word line being adjacent to the second word line, and wherein a plurality of memory cells coupled to the second word line are in an erase state.

3. The memory system of claim 1, wherein the memory controller is further configured to:
read data of the memory cell page in response to the number of read failure bits of the memory cell page being greater than the preset threshold;
perform error correction on the data of the memory cell page to obtain the error corrected data; and
send the error corrected data of the memory cell page and the reprogram instruction to the memory device to perform a reprogram operation on the memory cell page.

4. The memory system of claim 3, wherein an initial value of the reprogram voltage is greater than an initial value of an original program voltage.

5. The memory system of claim 3, wherein the control logic is further configured to:
after controlling the row decoder to output the reprogram voltage to the first word line,
control the row decoder to output a verification voltage to the first word line; and
control the page buffer to output a bit line voltage to the bit line coupled to the first memory cell.

6. The memory system of claim 1, wherein, in response to the number of read failure bits of the memory cell page being greater than the preset threshold, the memory controller is configured to reduce a threshold voltage offset of at least one memory cell of the memory cell page.

7. An operating method of a memory system, comprising:
acquiring a number of read failure bits of a memory cell page coupled to a first word line of a memory device in the memory system, the memory device coupled to a memory controller and comprising a control logic, a row decoder and a page buffer, the memory cell page comprising a first memory cell and a second memory cell;
determining whether the number of read failure bits of the memory cell page is greater than a preset threshold; and
controlling the memory device to perform a reprogram operation on the memory cell page coupled to the first word line in response to the number of read failure bits of the memory cell page being greater than the preset threshold by:
controlling, by the control logic, the row decoder to provide a reprogram voltage to the first word line in response to a reprogram instruction; and
controlling the page buffer to provide a program select voltage to a bit line coupled to the first memory cell and provide a program inhibit voltage to a bit line coupled to the second memory cell based on error corrected data of the memory cell page,
wherein a threshold voltage of the first memory cell is higher than a threshold voltage of the second memory cell, and
wherein the memory cell page comprises the memory cell page of which the number of read failure bits is greater than the preset threshold.

8. The operating method of claim 7, wherein the memory device further comprises a second word line, the first word line being adjacent to the second word line, and wherein a plurality of memory cells coupled to the second word line are in an unprogrammed erase state.

9. The operating method of claim 7, wherein controlling the memory device to perform a reprogram operation on the memory cell page coupled to the first word line comprises:
reading data of the memory cell page in response to the number of read failure bits of the memory cell page being greater than the preset threshold;
performing error correction on the data of the memory cell page to obtain the error corrected data; and
sending the error corrected data of the memory cell page and the reprogram instruction to the memory device to perform a reprogram operation on the memory cell page.

10. The operating method of claim 9, wherein an initial value of the reprogram voltage is greater than an initial value of an original program voltage.

11. The operating method of claim 9, further comprising:
after controlling, by the control logic, the row decoder to output a reprogram voltage to the first word line,
controlling, by the control logic, the row decoder to output a verification voltage to the first word line; and
controlling, by the control logic, the page buffer to output a bit line voltage to the bit line coupled to the first memory cell.

12. The operating method of claim 7, further comprising, in response to the number of read failure bits of the memory cell page being greater than the preset threshold, reducing a threshold voltage offset of at least one memory cell of the memory cell page.

13. An electronic device, comprising:
a host; and
a memory system comprising:
a memory controller coupled to the host; and
a memory device coupled to the memory controller and comprising, a control logic, a row decoder, and a page buffer, wherein the memory controller is configured to:
acquire a number of read failure bits of a memory cell page coupled to a first word line of a memory device, wherein the memory cell page comprises a first memory cell and a second memory cell;
determine whether the number of read failure bits of the memory cell page is greater than a preset threshold;
control the memory device to perform a reprogram operation on the memory cell page coupled to the first word line in response to the number of read failure bits of the memory cell page being greater than the preset threshold,
wherein the control logic is configured to:
control the row decoder to provide a reprogram voltage to the first word line in response to a reprogram instruction; and
control the page buffer to provide a program select voltage to a bit line coupled to the first memory cell and output a program inhibit voltage to a bit line coupled to the second memory cell based on error corrected data of the memory cell page,
wherein a threshold voltage of the first memory cell is higher than a threshold voltage of the second memory cell, and
wherein the memory cell page comprises the memory cell page of which the number of read failure bits is greater than the preset threshold.

14. The electronic device of claim 13, wherein the memory controller further comprises:
a host interface coupled with the host; and
a memory device interface coupled with the memory device.

15. The electronic device of claim 13, wherein the memory device further comprises a second word line, the first word line being adjacent to the second word line, and wherein a plurality of memory cells coupled to the second word line are in an erase state.

16. The electronic device of claim 13, wherein the memory controller is further configured to:
read data of the memory cell page in response to the number of read failure bits of the memory cell page being greater than the preset threshold;
perform error correction on the data of the memory cell page to obtain the error corrected data; and
send the error corrected data of the memory cell page and the reprogram instruction to the memory device to perform a reprogram operation on the memory cell page.

17. The electronic device of claim 16, wherein an initial value of the reprogram voltage is greater than an initial value of an original program voltage.

18. The electronic device of claim 16, wherein the control logic is further configured to:
after controlling the row decoder to output the reprogram voltage to the first word line,
control the row decoder to output a verification voltage to the first word line; and
control the page buffer to output a bit line voltage to the bit line coupled to the first memory cell.

19. The electronic device of claim 13, wherein the memory device comprises a NAND memory device.

20. The electronic device of claim 13, wherein, in response to the number of read failure bits of the memory cell page being greater than the preset threshold, the memory controller is configured to reduce a threshold voltage offset of at least one memory cell of the memory cell page.

* * * * *